United States Patent Office 3,041,346
Patented June 26, 1962

3,041,346
CERTAIN POLYFLUORINATED PYRROLINE AND PIPERIDEINE DERIVATIVES AND PROCESS
Ehrenfried H. Kober and Rudi F. W. Rätz, Hamden, and Henri Ulrich, New Haven, Conn., assignors to Olin Mathieson Chemical Corporation
No Drawing. Filed Sept. 12, 1960, Ser. No. 55,119
17 Claims. (Cl. 260—296)

This invention relates to novel derivatives of fluorinated heterocyclic compounds and to a method for their preparation. In particular, this invention relates to the preparation of compounds of the formula:

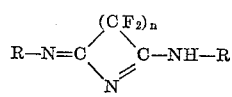

wherein $n$ is an integer of from 2 to 4 and R is selected from the group consisting of hydrogen, alkyl, amino, aryl, monohaloaryl, or mononitroaryl groups. The alkyl groups contain not more than 15 carbon atoms and include, for example, ethyl, butyl, amyl, heptyl, octyl, etc. Useful halogens include fluorine, chlorine, bromine and iodine. The aryl groups preferably contain not more than 8 carbon atoms and include, for example, phenyl, tolyl and xylyl.

It has been found that the novel compounds of this invention can be prepared by reacting a compound of the formula:

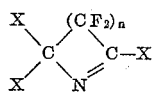

with ammonia, hydrazine or an aliphatic or aromatic primary amine according to the following equation:

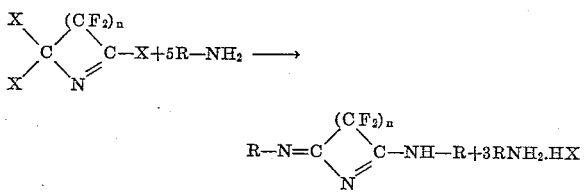

wherein $n$ is an integer of from 2 to 4, R is hydrogen, an alkyl group, an amino group, an aryl group, a monohaloaryl group or a mononitroaryl group and X is fluorine, chlorine or bromine. Suitable aminating agents for this invention are ammonia, hydrazine, aniline, ethylamine, isopropylamine, heptylamine, octylamine, dodecylamine, 2-nitroaniline, 5-nitroaniline, 2-fluoroaniline, 4-fluoroaniline, 2-chloroaniline, 3-chloroaniline, 3-methyl-5-fluoroaniline, 2-methyl-4-fluoroaniline, 2-methyl-4-chloroaniline, 3-methyl-4-chloroaniline, 3-methyl-5-nitroaniline, 2,4-dimethyl-6-fluoroaniline, 3,4-dimethyl-6-chloroaniline, 3,5-dimethyl-6-nitroaniline and 2,4-dimethyl-5-nitroaniline. Fluorinated heterocyclic derivatives useful as starting materials include heptafluoro-1-pyrroline, 2,5,5-trichloro-3,3,4,4-tetrafluoro-1-pyrroline, 2,5,5-tribromo-3,3,4,4-tetrafluoro-1-pyrroline, nonafluoro-1-piperideine, 2,6,6-trichloro-3,3,4,4,5,5-hexafluoro-1-piperideine, 2,6,6-tribromo-3,3,4,4,5,5-hexafluoro-1-piperideine, etc. Such fluorinated heterocyclic derivatives, with the exception of heptafluoro-1-pyrroline and nonafluoro-1-piperideine, can be prepared as described and claimed in the Grundmann, Kober, Rätz and Ulrich application Serial No. 55,118 filed of even date herewith and entitled Product and Process. The compounds heptafluoro-1-pyrroline and nonafluoro-1-piperideine can be prepared by the method described and claimed in the Grundmann, Kober and Ulrich application Serial No. 55,120 filed of even date herewith and entitled Composition and Method.

The reaction of ammonia, hydrazine, an aliphatic primary amine or an aromatic primary amine with the fluorinated heterocyclic derivatives can be carried out under widely different conditions. In general, the reaction is carried out by admixing the primary amine with the fluorinated heterocyclic derivatives. Although not necessary, if desired, the reaction can be carried out in the presence of a solvent such as water, but preferably in the presence of an inert solvent. Suitable inert solvents include, for example, chloroform, carbon tetrachloride, etc. and the lower dialkyl ethers, such as ethyl ether, isopropyl ether, ethyl methyl ether, and amyl ether. Aliphatic hydrocarbon solvents, such as pentane, hexane, heptane, etc., are also useful and, in addition, the aromatic solvents, such as benzene, toluene, and xylene, can be employed. The order of addition of the reactants is not important in that the reaction can be carried out equally as well when the fluorinated heterocyclic starting material is added with admixing to the aminating agent. One of the reactants itself when used in an excess, may serve as a solvent.

Although the reaction proceeds satisfactorily with high yield of the desired product when the stoichiometric quantity of the aminating agent is reacted with the useful fluorinated heterocyclic derivatives, the ratio of the reactants can be varied widely, if desired, from 5 to about 50 moles or more of aminating agent per mole of the fluorinated heterocyclic derivative. The preferred range is from 5 to about 35 moles of aminating agent per mole of fluorinated heterocyclic derivative employed.

The reaction temperature can be varied widely from about −120° C. to about 130° C. depending upon the particular aminating agent and solvent being used, with the preferred reaction temperature being from about −90° C. to about the reflux temperature of the reaction mixture. If necessary, the products can be separated from the by-product salts (such as aniline hydrochloride when aniline is used as the aminating agent) by extraction with suitable solvents such as the lower dialkyl ethers as exemplified by ethyl ether, n-propyl ether, isopropyl ether, methyl-ethyl ether, etc.

The novel compounds of this invention are useful for the preparation of valuable heat-stable polymers. For example, a valuable linear polymer can be prepared by heating 2-amino-6-imino-3,3,4,4,5,5-hexafluoro-1-piperideine and heptafluorobutyroamidine as more fully described in Kober, Rätz and Ulrich application Serial No. 55,121, filed of even date herewith and entitled Product and Method.

The following examples illustrate various specific embodiments of this invention and are to be considered not limitative.

EXAMPLE I

*2-N-Phenylamino-5-N-Phenylimino-3,3,4,4-Tetrafluoro-1-Pyrroline*

To a solution of 5.9 grams (0.064 mole) of aniline in 80 milliliters of dry diethyl ether 3 grams (0.012 mole) of 2,5,5 - trichloro - 3,3,4,4 - tetrafluoro - 1-pyrroline was added dropwise with stirring at 0°. After stirring for several hours, the precipitated aniline hydrochloride was removed. Evaporation of the diethyl ether yielded a solid product which was contaminated with aniline. This material was dissolved in diethyl ether and washed with 2-N-hydrochloric acid. Then the ether was removed, resulting in 1.5 grams of a solid residue. Extraction of this solid in refluxing ligroin resulted, upon cooling of the extract, in the precipitation of 0.7 gram of white crystals of 2 - N-phenylamino-5-N-phenylimino-3,3,4,4-tetrafluoro-1-pyrroline, M.P. 130°–132° C.

EXAMPLE II

2-N-Phenylamino-6-N-Phenylimino-3,3,4,4,5,5-Hexafluoro-1-Piperideine

Ten grams (0.034 mole) of 2,6,6-trichloro-3,3,4,4,5,5-hexafluoro-1-piperideine was added in small portions to 18 grams (0.193 mole) of aniline in 150 milliliters of dry diethyl ether with ice-cooling. After removal of the aniline hydrochloride formed as a by-product and evaporation of the diethyl ether, 12 grams (95 percent of the theoretical quantity) of 2-N-phenylamino-6-N-phenylimino-3,3,4,4,5,5-hexafluoro-1-piperideine, M.P. 144–146° C., was obtained. The product was analyzed for carbon, hydrogen and nitrogen and the following results were obtained.

Calcd. for $C_{17}H_{11}F_6N_3$: C, 54.99; H, 2.98; N, 11.31. Found: C, 55.21, 55.27; H, 3.03, 3.21; N, 10.94, 10.98.

EXAMPLE III

2-N-Dodecylamino-6-N-Dodecylimino-3,3,4,4,5,5-Hexafluoro-1-Piperideine

Ten grams (0.034 mole) of 2,6,6-trichloro-3,3,4,4,5,5-hexafluoro-1-piperideine was added in small portions to 38 grams (0.205 mole) of dodecylamine in 150 milliliters of dry ether with ice-cooling. After removal of the dodecylamine hydrochloride and evaporation of the ether, 16 grams (83 percent of the theoretical quantity) of 2-N-dodecylamino-6-N-dodecylimino-3,3,4,4,5,5 - hexafluoro-1-piperideine, M.P. 57–58° C., was obtained. The product was analyzed for carbon, hydrogen an nitrogen and the results are presented below.

Calcd. for $C_{29}H_{51}F_6N_3$: C, 62.68; H, 9.24; N, 7.58. Found: C, 63.21, 63.11; H, 10.01, 9.90; N, 7.85, 7.68.

EXAMPLE IV

2-Hydrazino-6-Hydrazono-3,3,4,4,5,5-hexafluoro-1-Piperideine

Ten grams (0.034 mole) of 2,6,6-trichloro-3,3,4,4,5,5-hexafluoro-1-piperideine were added, with stirring, to 5.5 grams (about 0.170 mole) of hydrazine (not less than 95 percent $N_2H_4$) in 100 milliliters of absolute ethanol at 0° C. An immediate orange coloration and precipitation of hydrazine hydrochloride was observed. After standing for one hour, the precipitate was removed and evaporation of the filtrate in vacuo was commenced. When most of the alcohol was evaporated a small quantity of hydrazine hydrochloride separated which was filtered off. Evaporation was continued and on complete evaporation of the alcohol a semi-solid red-brown product was obtained. This crude product was re-dissolved in ethanol and upon evaporation of the solvent 5.8 grams of a yellow-brown semi-solid product was obtained; M.P. 130°–170° C. (with decomposition). Further purification was achieved by treatment with a mixture of methanol and diethyl ether. Evaporation of this solvent mixture gave solid, still amorphous 2-hydrazino-6-hydrazono-3,3,4,4,5,5-hexafluoro-1-piperideine which melted at 161°–172° C. with decomposition. Carbon, hydrogen and nitrogen content of the product was determined and the following results were obtained.

Calcd. for $C_5H_5F_6N_5$: C, 24.10; H, 2.05; N, 28.10. Found: C, 24.01, 23.99; H, 2.17, 2.38; N, 25.59, 25.40.

EXAMPLE V

2-Amino-6-Imino-3,3,4,4,5,5-Hexafluoro-1-Piperideine

Thirty-one grams (0.105 mole) of 2,6,6-trichloro-3,3,4,4,5,5-hexafluoro-1-piperideine was added dropwise to an excess of liquid ammonia at −78° C. After evaporation of the excess ammonia, 2-amino-6-imino-3,3,4,4,5,5-hexafluoro-1-piperideine was separated from the ammonium chloride by extraction with dry diethyl ether. Evaporation of the ether yielded 23 grams (98 percent of the theoretical quantity) of 2-amino-6-imino-3,3,4,4,5,5-hexafluoro-1-piperideine, M.P. 162° C. Analysis of the product for carbon, hydrogen, nitrogen and fluorine gave the following results.

Calcd. for $C_5H_3F_6N_3$: C, 27.70; H, 1.38; N, 19.17; F, 52.03. Found: C, 27.83, 28.01; H, 1.87, 1.97; N, 18.38, 18.40; F, 52.01, 52.34.

EXAMPLE VI

2-Amino-5-Imino-3,3,4,4-Tetrafluoro-1-Pyrroline

The 2,5,5-trichloro-3,3,4,4-tetrafluoro-1-pyrroline used as a starting material in this experiment was obtained by heating together 57.8 grams of tetrafluorosuccinimide with 140 grams of phosphorus pentachloride at a temperature of 150°–160° C. for 30 hours. To this reaction mixture, heated to refluxing temperature, there was added gradually 240 grams of lead difluoride. After refluxing for an additional 30 hour period, 89 grams of 2,5,5-trichloro-3,3,4,4-tetrafluoro-1-pyrroline which still contained some phosphorus oxychloride as shown by refractive index ($n_D^{27}$ 1.4362) was distilled off.

The 89 grams of 2,5,5-trichloro-3,3,4,4-tetrafluoro-1-pyrroline containing some phosphorus oxychloride, prepared as described above, was added with stirring to an excess of ammonia maintained at −80° C. The excess ammonia was evaporated and the remainder was extracted first with ether and finally with absolute ethanol. Evaporation of the solvents yielded 12.2 grams of 2-amino-5-imino-3,3,4,4 - tetrafluoro - 1 - pyrroline; white needles (from acetone). The product was analyzed for carbon, hydrogen, fluorine and nitrogen and the following results were obtained.

Calcd. for $C_4H_3F_4N_3$: C, 28.35; H, 1.78; F, 44.94; N, 24.84. Found: C, 29.28; H, 2.50; F, 43.63; N, 24.22.

EXAMPLE VII

2-Amino-5-Imino-3,3,4,4-Tetrafluoro-1-Pyrroline

An amount of 300 milliliters of absolute ether was placed in a 3 liter, three-neck flask and saturated at −78° C. with gaseous ammonia. A solution of 12.2 grams (0.049 mole) of 2,5,5-trichloro-3,3,4,4-tetrafluoro-1-pyrroline in 50 milliliters of absolute ether was added dropwise with stirring at −78° C. over a period of 20 minutes while the flow of ammonia was continued. After two hours of additional stirring at −40° C., the mixture was allowed to warm up to room temperature. A mixture of 11.3 grams of ammonium chloride and 2-amino-5-imino-3,3,4,4-tetrafluoro-1-pyrroline was collected on a Buchner funnel. Removal of the diethyl ether from the filtrate by evaporation gave 4.4 grams of pure 2-amino-5-imino-3,3,4,4-tetrafluoro-1-pyrroline. Extracting the ether-insoluble part twice with 500 milliliter portions of diethyl ether, followed by evaporation of the ether resulted in the recovery of an additional amount of 3.2 grams of 2-amino-5-imino-3,3,4,4-tetrafluoro-1-pyrroline, thus increasing the overall yield to 7.6 grams (90.3 percent of the theoretical quantity).

EXAMPLE VIII

2-Amino-6-Imino-3,3,4,4,5,5-Hexafluoro-1-Piperideine

Ten grams (0.034 mole) of 2,6,6-trichloro-3,3,4,4,5,5-hexafluoro-1-piperideine were added dropwise at 0° C. to 150 milliliters of dry benzene saturated with ammonia. After stirring for one hour, the precipitated ammonium chloride was removed by filtration. Evaporation of the benzene gave 4.1 grams of 2-amino-6-imino-3,3,4,4,5,5-hexafluoro-1-piperideine which was purified by dissolving in ether followed by reprecipitation with petroleum ether (Skellysolve F). This procedure resulted in white crystals, M.P. 170–173° C. The product was analyzed for carbon and hydrogen and the values set forth below were obtained.

Calcd. for $C_5H_3F_6N_3$: C, 27.70; H, 1.38. Found: C, 27.53, 27.31; H, 1.38, 1.53.

EXAMPLE IX

*2-Amino-6-Imino-3,3,4,4,5,5-Hexafluoro-1-Piperideine*

An amount of 700 milliliters of ether was saturated with gaseous ammonia at −78° C. To this solution, kept at −78° C., 30 grams (0.102 mole) of 2,6,6-trichloro-3,3,4,4,5,5-hexafluoro-1-piperideine in 100 milliliters of diethyl ether was added dropwise, with stirring. Ammonia was passed into the reaction mixture for 30 minutes and then the reaction mixture was allowed to warm up to room temperature. After the excess ammonia was evaporated, the residue was filtered and 16.2 grams of ammonium chloride was obtained. The diethyl ether was removed from the filtrate by distillation which resulted in a white, crystalline residue consisting of 21.8 grams (98 percent of the theoretical quantity) of 2-amino-6-imino-3,3,4,4,5,5-hexafluoro-1-piperideine, M.P. 167° C.

EXAMPLE X

*2-Amino-6-Imino-3,3,4,4,5,5-Hexafluoro-1-Piperideine*

An amount of 11.0 grams (0.038 mole) of 2,6,6-trichloro-3,3,4,4,5,5-hexafluoro-1-piperideine was added dropwise, with stirring, to 60 milliliters of 25 percent aqueous ammonia (about 0.82 mole of ammonia) at −10° C. over a period of 30 minutes. After three hours of additional stirring, the precipitated product was collected on a Buchner funnel and extracted with 50 milliliters of water. The remainder consisted of 1.003 grams (12.6 percent of the theoretical quantity) of 2-amino-6-imino-3,3,4,4,5,5-hexafluoro-1-piperideine, M.P. 164° C., identified by means of a mixed melting point determination with an authentic sample.

What is claimed is:

1. A process for the preparation of fluorinated heterocyclic compounds which comprises reacting a primary amine of the formula:

$$R-NH_2$$

wherein R is selected from the group consisting of hydrogen, alkyl, $NH_2$, phenyl, tolyl, xylyl, monohaloaryl and mononitroaryl groups, wherein the alkyl group of the alkyl substituents of R contains from 1 to 15 carbon atoms, and the aryl group of the aryl-containing substituents of R is hydrocarbon arylene of no more than 8 carbon atoms, with a compound of the formula:

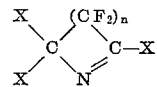

wherein $n$ is an integer of from 2 to 4 and X is a halogen selected from the group consisting of fluorine, chlorine and bromine.

2. The process of claim 1 in which the said compound is 2,5,5-trichloro-3,3,4,4-tetrafluoro-1-pyrroline.

3. The process of claim 1 in which the said compound is 2,6,6-trichloro-3,3,4,4,5,5-hexafluoro-1-piperideine.

4. The process of claim 1 in which the temperature of the reaction is from about −120° C. to about 130° C.

5. The process of preparing 2-N-phenylamino-5-N-phenylimino-3,3,4,4-tetrafluoro-1-pyrroline which comprises reacting aniline with 2,5,5-trichloro-3,3,4,4-tetrafluoro-1-pyrroline.

6. The process of preparing 2-N-phenylamino-6-N-phenylimino-3,3,4,4,5,5-hexafluoro-1-piperideine which comprises reacting aniline with 2,6,6-trichloro-3,3,4,4,5,5-hexafluoro-1-piperideine.

7. The process of preparing 2-N-dodecylamino-6-N-dodecylimino-3,3,4,4,5,5-hexafluoro-1-piperideine which comprises reacting dodecylamine with 2,6,6-trichloro-3,3,4,4,5,5-hexafluoro-1-piperideine.

8. The process of preparing 2-hydrazino-6-hydrazono-3,3,4,4,5,5-hexafluoro-1-piperideine which comprises reacting hydrazine with 2,6,6-trichloro-3,3,4,4,5,5-hexafluoro-1-piperideine.

9. The process of preparing 2-amino-5-imino-3,3,4,4-tetrafluoro-1-pyrroline which comprises reacting ammonia with 2,5,5-trichloro-3,3,4,4-tetrafluoro-1-pyrroline.

10. The process of preparing 2-amino-6-imino-3,3,4,4,5,5-hexafluoro-1-piperideine which comprises reacting ammonia with 2,6,6-trichloro-3,3,4,4,5,5-hexafluoro-1-piperideine.

11. Fluorinated heterocyclic compounds of the formula:

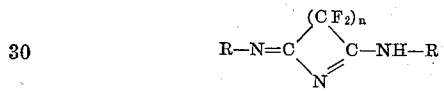

wherein R is selected from the group consisting of hydrogen, alkyl, $NH_2$, phenyl, tolyl, and xylyl, monohaloaryl, and mononitroaryl groups and $n$ is an integer of from 2 to 4, wherein the alkyl group of the alkyl substituents of R contains from 1 to 15 carbon atoms, and the aryl group of the aryl-containing substituents of R is hydrocarbon arylene of no more than 8 carbon atoms.

12. 2-N-phenylamino-5-N-phenylimino-3,3,4,4-tetrafluoro-1-pyrroline.

13. 2-N-phenylamino-6-N-phenylimino-3,3,4,4,5,5-hexafluoro-1-piperideine.

14. 2-N-dodecylamino-6-N-dodecylimino-3,3,4,4,5,5-hexafluoro-1-piperideine.

15. 2-hydrazino-6-hydrazono-3,3,4,4,5,5-hexafluoro-1-piperideine.

16. 2-amino-5-imino-3,3,4,4-tetrafluoro-1-pyrroline.

17. 2-amino-6-imino-3,3,4,4,5,5-hexafluoro-1-piperideine.

References Cited in the file of this patent

UNITED STATES PATENTS 2,810,726    Howard  ---------------- Oct. 22, 1957